July 14, 1953
C. H. HASTINGS ET AL
2,645,151
APPARATUS FOR DYNAMIC DETERMINATION OF REDUCTION
IN AREA OF SPECIMENS DURING MECHANICAL TESTS
Filed Dec. 29, 1948
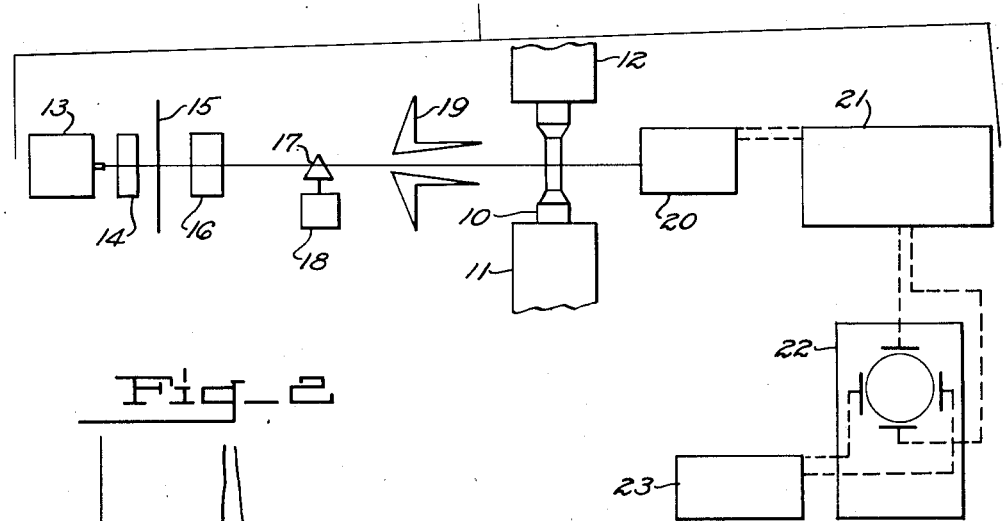
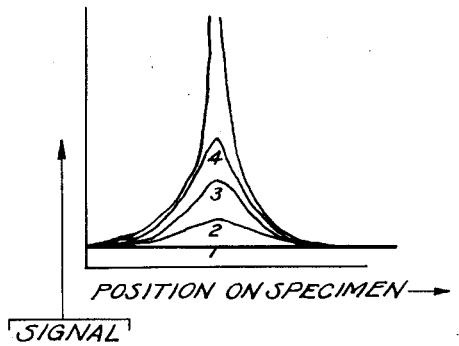
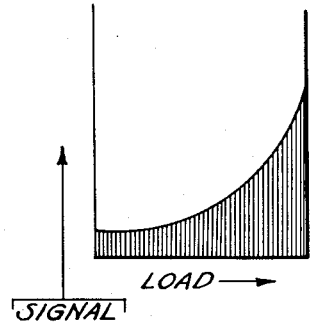
Inventors
Carlton H. Hastings
Seymour W. Carter Patented July 14, 1953

2,645,151

UNITED STATES PATENT OFFICE 2,645,151

APPARATUS FOR DYNAMIC DETERMINATION OF REDUCTION IN AREA OF SPECIMENS DURING MECHANICAL TESTS

Carlton H. Hastings, Newton, and Seymour W. Carter, Hopkinton, Mass.

Application December 29, 1948, Serial No. 67,902

4 Claims. (Cl. 88—14)

(Granted under Title 35, U. S. Code (1952), sec. 266)

The invention described in the specification and claims may be manufactured and used by or for the Government for governmental purposes without the payment to us of any royalty thereon.

This invention relates to an apparatus for continuously recording the reduction in area of specimens during mechanical tests.

The usual practice for determining the reduction in area of test specimens is to make such determination only after the test has been completed and such determination relates only to final conditions at the time of fracture rather than to the condition at any instant during the test prior to the fracture.

Up to now no entirely satisfactory solution has been advanced whereby continuous recording of the measurement of the reduction in area of test specimens during tensile tests could be conducted at any rate of loading, any strain rate and at any temperature. The problem was further complicated when the strain rate, or rate of loading, was high, or when high or low temperatures were to be applied to the specimen. While other devices for automatically measuring the reduction in area of the test piece under strain have been used such devices are not only of a rather complicated nature but do not produce results of a sufficiently high accuracy due largely to too slow a response to the rapidly changing conditions of the test piece.

Accordingly it is an object of this invention to provide an apparatus for continuously indicating and/or recording the change in diameter or section of test specimens as a function of time or distance along the specimen axis which can be related to elongation or load applied at any instant during a test.

The specific nature of the invention as well as other objects and advantages thereof will clearly appear from a description of a preferred embodiment as shown in the accompanying drawings in which:

Fig. 1 is a schematic view of the apparatus utilized in the practice of this invention;

Fig. 2 is a diagram with the varying diameter of the specimen plotted against the length of the specimen; and Fig. 3 is a diagram showing the variation of the diameter plotted against the load applied to the specimen.

This invention consists essentially of projecting a light beam through an oscillating prism at a specimen being tested in a tensile machine and by a photoelectric cell converting the light passing by the test specimen to electrical energy, amplifying such electric energy, applying such electricity to a cathode ray tube and thence deflecting the cathode ray beam in synchronism with the light scanning device to continuously record a profile of the test specimen under test.

The quantity of light which can pass the test piece will vary as a function of the diameter or width of the piece at any instant. The minimum diameter of the test piece is indicated by the maximum amount of light passing by such test piece.

In Fig. 1 there is shown schematically the apparatus utilized for continuously recording the reduction in diameter of a test specimen under mechanical test. In such figure there is shown a test specimen 10 which may be a test bar of steel or other material held in the closed jaws 11 and 12 of a testing machine (not shown). A constant light source 13 is preferably produced by a direct current and is utilized to produce a light beam which is directed preferably at the test specimen on a horizontal line at the center of such test piece. The light from source 13 is passed through a condensing lens 14, a limiting diaphragm 15, then through a collimating lens 16. Immediately ahead of collimating lens 16 there is provided a prism 17. Such prism is connected to an oscillating device 18 to continuously rock prism 17 within a predetermined arc. The beam of light from collimating lens 16 passes through prism 17, thence through a second limiting diaphragm 19. The beam of light then strikes test specimen 10 supported in jaws 11 and 12.

The beam of light coming through the various elements just described is preferably of a rectangular cross-section and is of a width sufficient to slightly overlap the largest diameter of the gauge length of the test specimen. The depth of the beam is preferably quite narrow so as to cover but a small increment of the length of specimen 10.

The prism oscillating device is employed to permit scanning of the test specimen by the beam of light. The speed of the scanning should be at least great enough to give sufficient accuracy for the specimen testing speed being employed. Other scanning devices may be employed than the one indicated. A mirror or a rotating slotted disk will also produce satisfactory scanning means.

The quantity of light passing by test specimen 10 is collected by a photoelectric cell 20. Such cell converts the light received thereon to electric energy and such energy is then relayed to an amplifier 21 and applied in turn to a cathode ray oscillograph 22. The cathode ray beam from oscillograph 22 is deflected in synchronism with the oscillating prism device 18.

Oscillating device 18 is utilized to rock prism 17 as it is necessary to scan a sufficient length of test specimen 10 to insure that the minimum diameter of the test specimen be scanned as it can not be predetermined where "necking" or in other words, where the minimum diameter of the test specimen will occur. The cathode ray oscillograph 22 is then accordingly adjusted so that the cathode ray beam therein is also deflected synchronously with the light scanning device or prism oscillating device 18 by means of a synchronized time base to produce a diagram as shown in Fig. 2. By utilizing a separate load measuring circuit 23 connected to the cathode ray oscillograph 22 instead of the light synchronized time base last mentioned, results of the test can be made to appear in the form of curves as in Fig. 3. Various ways of presenting data may be arranged to suit particular requirements, thus diameter vs. load, diameter vs. position along the gauge length or other diagram may be conveniently traced utilizing the change in specimen diameter as one of the vehicles. Thereby the true stress, true strain, or instantaneous stress-strain relationship can be determined from data obtained by means of this apparatus.

If the diameter vs. load diagram is required it would not be necessary to restrict the shape of the light beam to a thin rectangle of light and to scan the specimen. In such event the entire specimen may be illuminated and the beam flashed intermittently to give a varying electrical signal from photocell 20.

While the above description relates to a preferred arrangement of this invention, other variations can readily be employed which lie within the scope of this invention. Thus from the foregoing description it is clearly apparent to those skilled in the art that there is here provided an apparatus for continuously determining the change in diameter of a specimen under physical test which is of relatively simple construction and one which produces a highly accurate result.

We claim:

1. Apparatus for determining the true stress-strain characteristics existing in a test specimen under mechanical strain at any given instant during the elastic and plastic deformation thereof comprising in combination, means for projecting a light beam directly at the specimen, means for continuously scanning said light beam along that portion of the test specimen wherein changes in cross-sectional area are anticipated, photoelectric means for producing a first electrical signal varying in accordance with the amount of light by-passing the specimen during changes in the cross-sectional area thereof, means for generating a second variable signal, and cathode ray oscilloscope means for combining the effects of said first and second signals to produce a visible trace wherein any point thereon represents the instantaneous cross-sectional area of the test specimen expressed as a function of said second signal.

2. Apparatus for determining the true stress existing in a test specimen under load at any given instant during the elastic and plastic deformation thereof comprising in combination, means for projecting a narrow rectangular beam of light directly at the test specimen, means for continuously scanning said light beam along that portion of the specimen wherein changes in cross-sectional area are anticipated, photoelectric means for producing an amplified first-electrical signal varying in accordance with the amount of light by-passing the test specimen, means for generating a second electrical signal varying in accordance with the amount of load applied to the specimen, and cathode ray oscilloscope means for combination the effects of said first and second signals to produce a visible trace indicative of the true instantaneous load-deformation relationship in the test specimen at any given point prior to rupture thereof.

3. Apparatus for determining the true stress existing in a test specimen under tensile load at any given instant during the elastic and plastic elongation thereof comprising in combination, a fixed source of light rays, means for collecting said rays to form a rectangular light beam wherein the major axis thereof is slightly larger than the specimen width and the minor axis comprises a relatively minute fraction of the specimen length, a continuously oscillating prism arranged to scan said rectangular light beam along the specimen length so that the extreme ends of said beam overlap the respective sides of the specimen, means for limiting the travel of said beam to that portion of the specimen wherein elongation is anticipated, photocell means for producing a first electrical signal varying in accordance with the amount of light by-passing the specimen as a result of changes in the cross-sectional area thereof, means for amplifying said first signal, a load-measuring circuit for generating a second electrical signal varying in accordance with the load applied to the specimen, and cathode ray oscilloscope means for combining the effects of said first and second signals to produce a visible trace corresponding to the actual cross-sectional area of the scanned portion of the specimen expressed as a function of the load applied thereto at the same instant.

4. Apparatus for determining the minimum cross-sectional area of a test specimen under tensile load at any instant throughout the elastic and plastic deformation thereof comprising in combination, a fixed source of light rays, means for collecting said rays to form a rectangular light beam wherein the major axis thereof is slightly larger than the specimen width and the minor axis comprises a relatively minute fraction of the specimen length, a continuously oscillating prism arranged to scan said light beam along the specimen length so that the extreme ends of said beam overlap the respective sides of the specimen, means for limiting the travel of said beam to that portion of the specimen wherein elongation is anticipated, photocell means for producing a first electrical signal varying in accordance with the amount of light by-passing the specimen as a result of changes in the cross-sectional area thereof, means for amplifying said first signal, means for generating an amplified second electrical signal in synchronization with the scanning movement of said light beam, and cathode ray oscilloscope means for combining the effects of said first and second signals into a visible trace depicting the changes in the location and magnitude of the minimum cross-sectional area of the test specimen.

CARLTON H. HASTINGS.
SEYMOUR W. CARTER.

References Cited in the file of this patent

UNITED STATES PATENTS

| Number | Name | Date |
|---|---|---|
| 2,085,671 | Powers | June 29, 1937 |
| 2,290,606 | Burnett | July 21, 1942 |
| 2,323,724 | Nadai et al. | July 6, 1943 |
| 2,360,883 | Metcalf | Oct. 24, 1944 |
| 2,411,741 | Michaelson | Nov. 26, 1946 |
| 2,444,560 | Feldt et al. | July 6, 1948 |
| 2,488,430 | Offner | Nov. 15, 1949 |
| 2,505,316 | Wilmotte et al. | Apr. 25, 1950 |
| 2,510,347 | Perkins | June 6, 1950 |
| 2,562,749 | Speer | July 31, 1951 |